July 9, 1946.  A. A. GONZÁLEZ  2,403,856
AUTOMOBILE ILLUMINATING ARRANGEMENT
Filed March 28, 1944  2 Sheets-Sheet 1
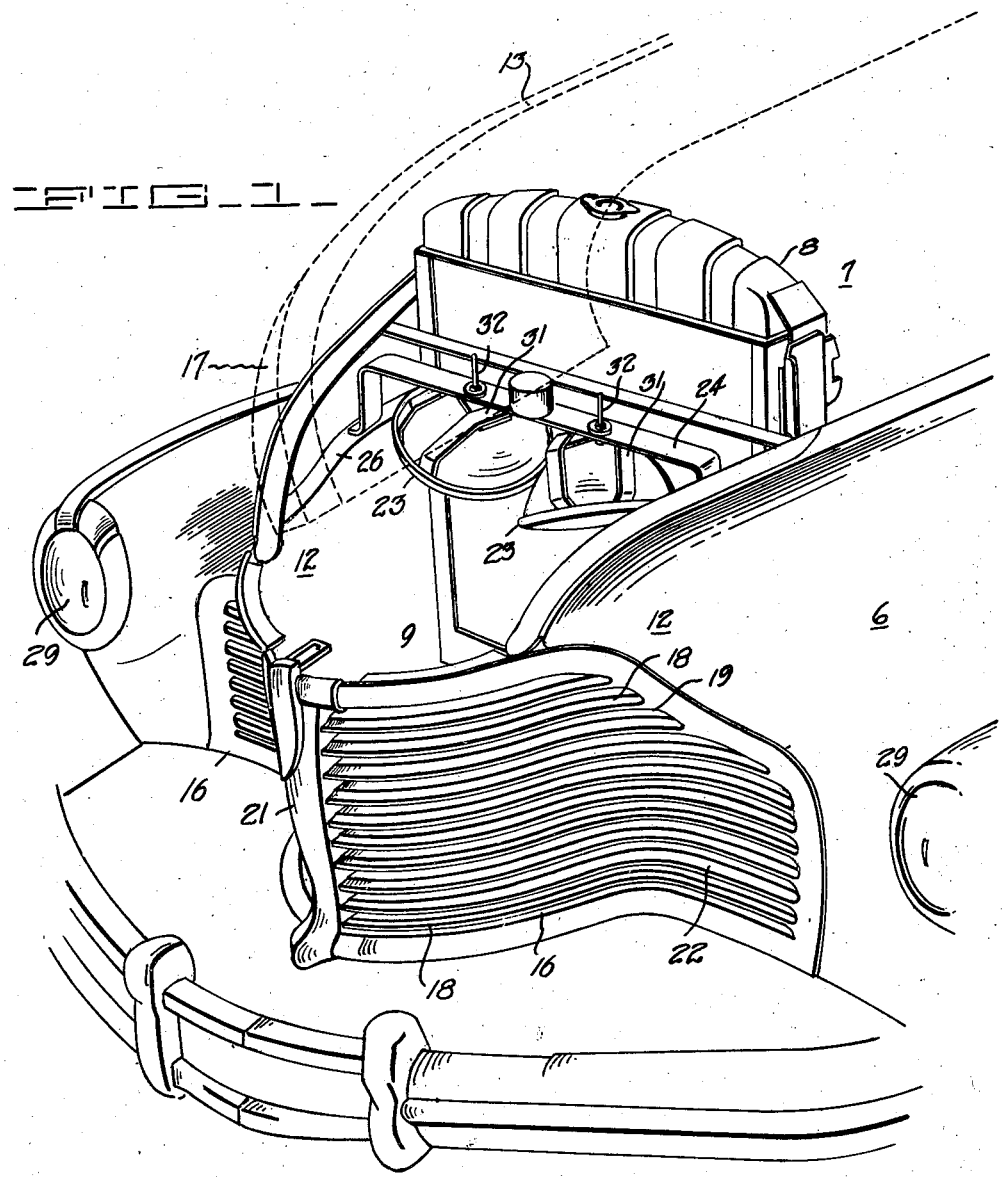
INVENTOR.
ALBERTO A. GONZALEZ
BY
Gardner + Warren
his attys.

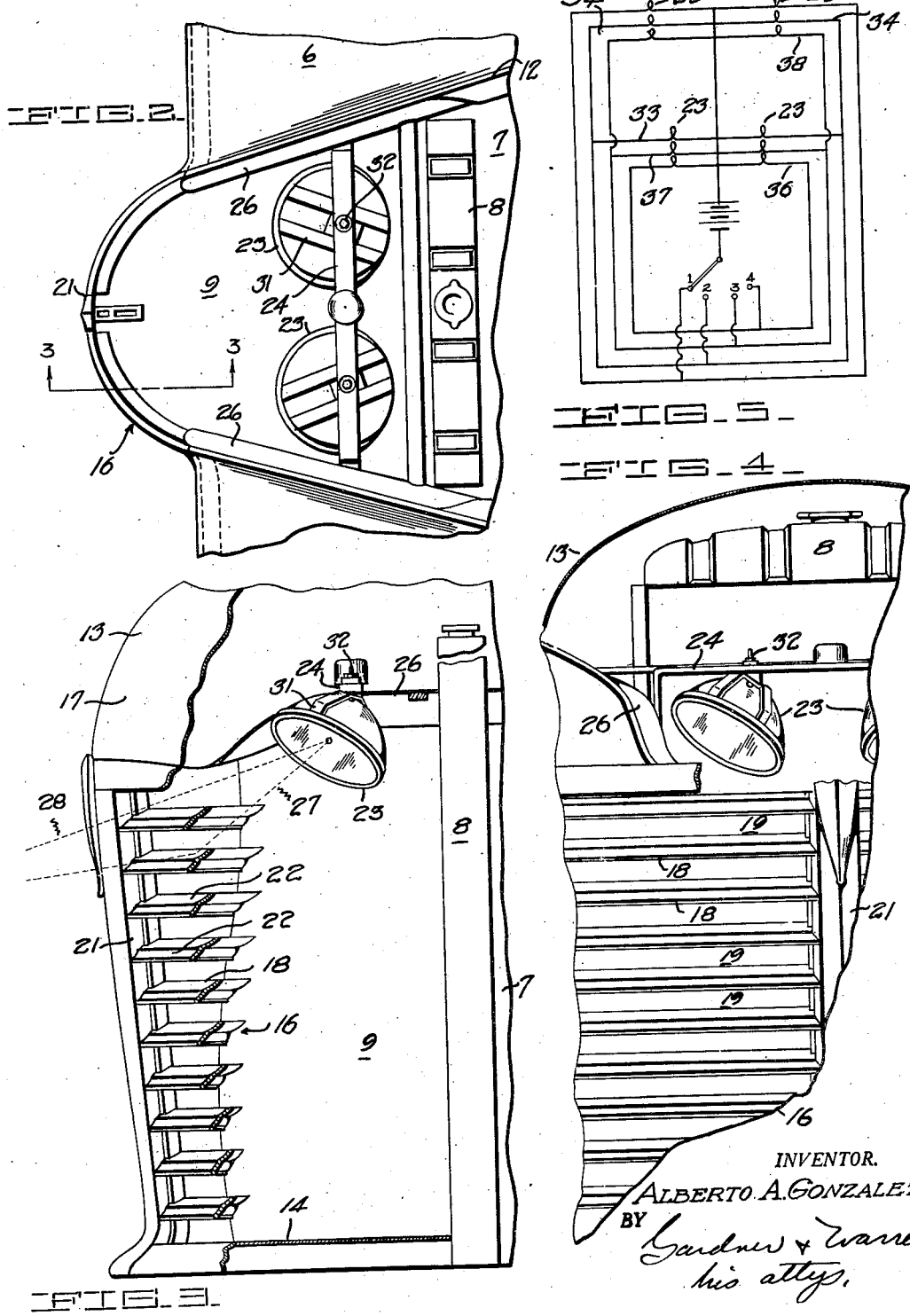

Patented July 9, 1946

2,403,856

UNITED STATES PATENT OFFICE 2,403,856

AUTOMOBILE ILLUMINATING ARRANGEMENT

Alberto Andrade González, San Francisco, Calif.

Application March 28, 1944, Serial No. 528,373

1 Claim. (Cl. 240—8.11)

The invention relates to a means for illuminating the grill at the front end of the compartment containing the radiator and engine of an automobile.

An object of the invention is to provide an arrangement of the character described which will provide for effective illumination of the grill so as to afford a clear view thereof to drivers of oncoming vehicles, while at the same time serving the driver of the vehicle as a source of roadway illumination of the portion of the roadway not within the area covered by the usual headlights.

Another object of the invention is to provide an illuminating arrangement of the character described which will have a source of illumination so positioned and arranged within the engine and radiator compartment that both the grill and roadway are illuminated as set forth above without rendering the source of illumination visible to the drivers of oncoming vehicles.

A further object of the invention is to provide for the automatic illumination of the grill at such time as the headlights of the car are changed from driving to passing beam focus, so that as the car is about to pass an oncoming vehicle, the driver of the latter will have revealed to him a definite indication of the position of the former car on the roadway notwithstanding that one or both of said headlights have become extinguished.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claim.

Referring to said drawings.

Figure 1 is a perspective view of the front end of an automobile arranged for illumination in accordance with my invention, portions of the hood being removed to disclose the hidden parts more clearly.

Figure 2 is a plan view of the automobile and parts as shown in Figure 1.

Figure 3 is a vertical sectional view of the automobile and parts as shown in Figure 2 except that a portion of the hood is included, the plane of the section being in part indicated by the line 3—3 of Figure 2.

Figure 4 is a fragmentary front view of the automobile as shown in Figure 3, with the hood portion broken away to disclose the hidden parts.

Figure 5 is a diagrammatic representation of the electrical wiring circuit for the control and operation of the grill and headlights.

The illumination arrangement of my invention is shown in the drawings as applied to an automobile 6 having at the front end thereof a compartment 7 in which are disposed the cooling radiator 8 and the engine (not shown). The radiator is spaced appreciably from the forward end of the compartment whereby a large space 9 is provided. The compartment including the space 9 is closed at the sides by walls 12, and at the top by a displaceable hood 13, and desirably a plate 14 is provided at the bottom of the space 9. At the front of said space 9 in the lower portion thereof is an opening which is engaged by a grill 16, while the upper portion is arranged to be closed by means of a bonnet or extension 17 of the hood 13. The grill 16 is formed with ribs 18 and spaces 19 here shown extending horizontally at opposite sides of a centrally disposed vertical divider strip 21.

The ribs have outer surfaces 22 which extend forwardly and downwardly, and are desirably highly polished, so as to provide a light reflecting medium. Mounted within the space 9 above the grill so as to be positioned directly in the rear of the bonnet when the hood is in closed position, is a source of light here shown in the form of a pair of electric lamps 23. The latter are supported on a cross-bar 24 attached at opposite ends to frame members 26 at the sides of the compartment, and the mountings of the lamps are such that the light rays emanating therefrom as shown at 27 in Figure 3 will strike the surfaces 22 of the ribs 18 and be deflected outwardly and forwardly therefrom, thus rendering the grill brilliantly visible from the exterior of the automobile.

It is important to note that while the lamps 23 are positioned high enough in the space 9 to be effectively concealed and at the same time appropriately direct the rays 27 upon the rib surfaces, they are positioned low enough to permit the emission of light rays 28 directly through the spaces 19 between the ribs. It will thus be seen that not only will reflected light be emitted from the grill, but rays of light will pass unimpeded through the grill downwardly and forwardly of the vehicle, so as to thereby illuminate the roadway between the front of the vehicle and the portion of the roadway ordinarily illuminated by the headlights 29. This increased area of frontal illumination serves to materially improve the driver's vision, particularly when passing oncoming cars with glaring headlights, and in this connection it will be noted that the lamps are turned slightly outwardly from each other causing the light rays from the different lamps to be directed divergently and thus provide a spread of light beyond the headlights close to the front of the car. The effect produced by illumination of the lamps 23 is improved by providing the lamps with colored lenses or bulbs such as amber in distinct contrast to the white light of the headlights. Preferably each of the lamps 23 are mounted in spiders 31 which are pivotally secured to the cross-bar 24 for adjustment about a vertical axis through pins 32.

Since the headlights 29 are disposed at opposite sides of the grill, it will be clear that when the latter is illuminated, the driver of an oncoming car will see the vehicle sharply defined by the two headlights and the centrally disposed illuminated grill, and furthermore in the event one or both of the headlights are extinguished the driver of said oncoming car will nevertheless be able to readily deduce the substantial location of the sides of the car.

As the foregoing feature is most important at night when vehicles are preparing to pass one another, it is desirable that the grill be illuminated whenever the headlight beams have been depressed or "dimmed" for passing. For this purpose the grill illumination circuit 33 in Figure 5 is connected to the headlight depressed or passing beam circuit 34, automatically insuring simultaneous illumination of the grill with the passing beam of the headlights. With this arrangement the full measure of safety is afforded without requiring constant illumination of the grill with consequent battery drain.

In order to permit illumination of the grill when desired independently of the headlights, a separate circuit connection 36 may be provided, and if desired an additional connection 37 may be provided with the parking light circuit 38.

I claim:

In a vehicle, said vehicle having a hood providing a compartment, a radiator forming the rear end of said compartment, a grill forming the forward end of said compartment, said grill having a plurality of horizontally arranged parallel downwardly inclined ribs, said ribs being provided with polished reflecting surfaces for reflecting light, said vehicle having headlights disposed outwardly of and located on each side of said compartment and arranged so that the light beams therefrom will be directed straight ahead of the vehicle, said compartment having sides, a frame member located within said compartment and adjacent each side and extending from said radiator forwardly toward said grill, a bracket within said compartment having its ends mounted on and connected to each frame member, and a plurality of light projectors mounted on said bracket and positioned angularly in relation to each other so as to divergently direct the rays from said light projectors upon the downwardly inclined ribs of said grill and the roadway in front of the vehicle but rearwardly of the road portion illuminated by said light beams of said headlights.

ALBERTO ANDRADE GONZÁLEZ.